(12) United States Patent
Kim et al.

(10) Patent No.: US 7,824,066 B2
(45) Date of Patent: Nov. 2, 2010

(54) PRISM MEMBER, BACKLIGHT ASSEMBLY PROVIDED WITH THE SAME, AND DISPLAY DEVICE PROVIDED WITH THE SAME

(75) Inventors: Joong-Hyun Kim, Suwon-si (KR); Seock-Hwan Kang, Suwon-si (KR); Seong-Yong Hwang, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 48 days.

(21) Appl. No.: 11/484,175

(22) Filed: Jul. 11, 2006

(65) Prior Publication Data

US 2007/0012350 A1 Jan. 18, 2007

(30) Foreign Application Priority Data

Jul. 13, 2005 (KR) .................... 10-2005-0063172

(51) Int. Cl.
*F21V 5/00* (2006.01)
(52) U.S. Cl. .................... 362/246; 362/223; 362/330
(58) Field of Classification Search ............ 362/330, 362/331, 332, 339, 606, 607, 615, 617, 618, 362/619, 620, 623, 624, 625, 626, 627, 223, 362/224, 243, 244, 245, 246
See application file for complete search history.

(56) References Cited

U.S. PATENT DOCUMENTS

| | | | |
|---|---|---|---|
| 5,339,179 A * | 8/1994 | Rudisill et al. .............. 362/619 |
| 6,172,809 B1 | 1/2001 | Koike et al. | |
| 6,277,471 B1 | 8/2001 | Tang | |
| 6,712,481 B2 * | 3/2004 | Parker et al. ................. 362/619 |
| 7,213,933 B2 * | 5/2007 | Chang et al. ................. 362/606 |
| 7,232,250 B2 * | 6/2007 | Chuang ..................... 362/620 |
| 2003/0035231 A1 | 2/2003 | Epstein et al. | |
| 2005/0243578 A1 * | 11/2005 | Lee et al. .................... 362/617 |
| 2006/0139959 A1 * | 6/2006 | Bae et al. .................... 362/615 |

FOREIGN PATENT DOCUMENTS

| CN | 2615679 | 5/2004 |
|---|---|---|
| CN | 1504776 | 6/2004 |
| JP | 2001-166113 | 6/2001 |
| JP | 2001-330828 | 11/2001 |
| JP | 2001-343507 | 12/2001 |
| JP | 2003-140126 | 5/2003 |
| KR | 1998-702614 | 7/1998 |
| KR | 1999-0082141 | 11/1999 |
| KR | 1020010001776 | 1/2001 |
| KR | 1020040000253 | 1/2004 |
| KR | 100432347 | 5/2004 |

OTHER PUBLICATIONS

English Abstract for Publication No. 2001-330828.
English Abstract for Publication No. 2001-343507.
English Abstract for Publication No. CN 2615679.
English Abstract for Publication No. CN 1504776.

* cited by examiner

*Primary Examiner*—Y My Quach Lee
(74) *Attorney, Agent, or Firm*—F. Chau & Associates, LLC

(57) ABSTRACT

A prism member, a backlight assembly having the same, and a display device having the same, wherein the prism member includes a plate-type body portion having a thickness, and a plurality of unit light-concentrating portions formed on the body portion and arranged along a first direction and in a second direction crossing the first direction.

12 Claims, 10 Drawing Sheets

PRISM MEMBER, BACKLIGHT ASSEMBLY PROVIDED WITH THE SAME, AND DISPLAY DEVICE PROVIDED WITH THE SAME

CROSS-REFERENCE TO RELATED APPLICATION

This application claims priority to and the benefit of Korean Patent Application No. 10-2005-0063172 filed in the Korean Intellectual Property Office on Jul. 13, 2005, the entire contents of which are incorporated herein by reference.

BACKGROUND OF THE INVENTION (a) Technical Field

The present disclosure relates to a prism member, a backlight assembly having the same, and a display device having the same. More particularly, the present disclosure relates to a prism member for further improving the luminance characteristic of passing light, a backlight assembly having the same, and a display device having the same.

(b) Discussion of the Related Art

Among various display devices, a liquid crystal display, which has highly improved performance with the down-sizing and weight reduction due to rapidly developing semiconductor technologies, has become one of several popular display devices.

Since a liquid crystal display has various advantages, such as down-sizing, weight reduction, and low power consumption, a liquid crystal display has gradually attracted attention as a viable display alternative for a conventional cathode ray tube (CRT). Recently, a liquid crystal display has been used as a display device for many other information processing devices that require a display device, such as small-sized products like cellular phones, personal digital assistances (PDAs), and so on, as well as middle/large sized products such as monitors, televisions, and so on.

A conventional liquid crystal display is a non-emissive type of display device in which the alignment of liquid crystal molecules is changed by applying a voltage to specifically align the liquid crystal molecules for displaying images using optical characteristic changes, which are caused by the change of the alignment of the liquid crystal molecules, such as such as birefringence, optical rotary power, dichroism, and optical scattering characteristics.

Since the liquid crystal display uses a non-emissive type of display panel that does not emit light by itself, the liquid crystal display has a backlight assembly for supplying light to a rear surface of the display panel.

The backlight assembly may use a lamp, such as a tube type cold cathode fluorescent lamp (CCFL) or an external electrode fluorescent lamp (EEFL), a planar light source providing uniform light, or a light emitting diode (LED) having a high luminance, as a light source.

In addition, the backlight assembly may include a prism member disposed between the liquid crystal panel and the light source in order to improve luminance characteristics of the light emitted from the light source. The prism member concentrates the light passed therethrough so as to improve luminance, however, a bright line may be generated in the light arriving at the liquid crystal panel after passing through the prism member. The bright line may be prevented from occurring by disposing the light source and the prism member to be spaced apart from each other by an optimal distance at which the bright line cannot be recognized.

The prism member, however, can be deviated from its original position by an external impact or it can be deformed by being bent or twisted by long exposure to high temperature or high humidity. In this case, the prism member may be at least partially spaced apart from the light source by the appropriate distance. Thus, a problem occurs that the bright line is generated in the light arriving at the liquid crystal panel after passing the prism member, and an external quality of the display device may be deteriorated.

SUMMARY OF THE INVENTION

Exemplary embodiments of the present invention have been made in an effort to provide a prism member having advantages of improving luminance characteristics of light passing therethrough.

In addition, exemplary embodiments of the present invention have been made in an effort to provide a backlight assembly including the prism member mentioned above.

Further, exemplary embodiments of the present invention have been made in an effort to provide a display device including the backlight assembly as mentioned above.

An exemplary embodiment of the present invention provides a prism member including a plate-type body portion having a known thickness and a plurality of unit light-concentrating portions formed on the body portion and arranged along a first direction and a second direction crossing the first direction.

The first direction may be a length direction of the unit light-concentrating portion and the second direction may be a width direction of the unit light-concentrating portion. A thickness of the body portion may be between 1 and 5 mm. A length of the unit light-concentrating portion may be less than 300 µm.

The unit light-concentrating portions arranged along the first direction among the plurality of the unit light-concentrating portions may be spaced apart with a non-light-concentrating region therebetween.

The plurality of the unit light-concentrating portions may have various lengths. An area of the non-light-concentrating region may be between 300 and 80,000 µm². The non-light-concentrating region may be formed to have an irregular cross section.

The unit light-concentrating portions arranged along the first direction among a plurality of the unit light-concentrating portions may be arranged to miss each other at an arbitrary line extending along the second direction. A height and a width of the unit light-concentrating portion may gradually decrease approaching both ends of the first direction. The unit light-concentrating portions arranged along the first direction may be arranged to partially overlap each other with respect to the second direction. The unit light-concentrating portion may be bent such that ends thereof face each other along the first direction. A cross section along the second direction may have a rounded or a polygonal shape.

An exemplary embodiment of the present invention provides a backlight assembly including a light source unit generating light, a prism member through which light emitted from the light source unit passes, and a supporting member for supporting the light source unit and the prism member. The prism member includes a plate-type body portion having a selected thickness, and a plurality of unit light-concentrating portions formed on the body portion and arranged along a first direction and a second direction crossing the first direction. The first direction may be a length direction of the unit light-concentrating portion and the second direction may be a width direction of the unit light-concentrating portion. A thickness of the body portion may be between 1 and 5 mm.

The unit light-concentrating portions arranged along the first direction among the plurality of the unit light-concentrating portions may be spaced with a non-light-concentrating region therebetween. The plurality of unit light-concentrating portions may have various lengths. The non-light-concentrating region may be formed to have an irregular cross section.

The unit light-concentrating portions arranged along the first direction among a plurality of unit light-concentrating portions may be arranged to miss each other at an arbitrary line extending along the second direction.

A height and a width of the unit light-concentrating portion may gradually decrease approaching both ends of the first direction. The unit light-concentrating portions arranged along the first direction may be arranged to partially overlap each other with respect to the second direction. The unit light-concentrating portions may be bent such that ends thereof face each other along the first direction. A cross section along the second direction may have a rounded or a polygonal shape. The light source unit may be a planar light source unit having a plurality of channel portions for emitting light.

An exemplary embodiment of the present invention provides a display device including a panel assembly for displaying an image, a light source unit for supplying light to the panel assembly, a prism member disposed between the panel assembly and the light source unit, and a supporting member for supporting the panel assembly, the light source unit, and the prism member. The prism member includes a plate-type body portion having a selected thickness, and a plurality of unit light-concentrating portions formed on the body portion and arranged along a first direction and a second direction crossing the first direction.

The first direction may be a length direction of the unit light-concentrating portion, and the second direction may be a width direction of the unit light-concentrating portion. A thickness of the body portion may be between 1 and 5 mm. The unit light-concentrating portions arranged along the first direction among the plurality of unit light-concentrating portions may be spaced with a non-light-concentrating region therebetween. The plurality of the unit light-concentrating portions may have various lengths. The non-light-concentrating region may be formed to have an irregular cross section.

The unit light-concentrating portions arranged along the first direction among a plurality of unit light-concentrating portions may be arranged to miss each other at an arbitrary line extending along the second direction. A height and a width of the unit light-concentrating portion may gradually decrease approaching both ends of the first direction. The unit light-concentrating portions arranged along the first direction may be arranged to partially overlap each other with respect to the second direction. The unit light-concentrating portions may be bent such that ends thereof face each other along the first direction. A cross section along the second direction may have a rounded or a polygonal shape. The light source unit may be a planar light source unit having a plurality of channel portions emitting light.

DETAILED DESCRIPTION OF THE EMBODIMENTS

Exemplary embodiments of the present invention can be understood in more detail from the following descriptions taken in conjunction with the accompanying drawings.

A prism member according to an exemplary embodiment of the present invention, a backlight assembly having the same, and a display device having the same will be described hereinafter with reference to the accompanying drawings. An exemplary embodiment of the present invention exemplifies the present invention, however, the present invention is not limited thereto.

Figure 1:
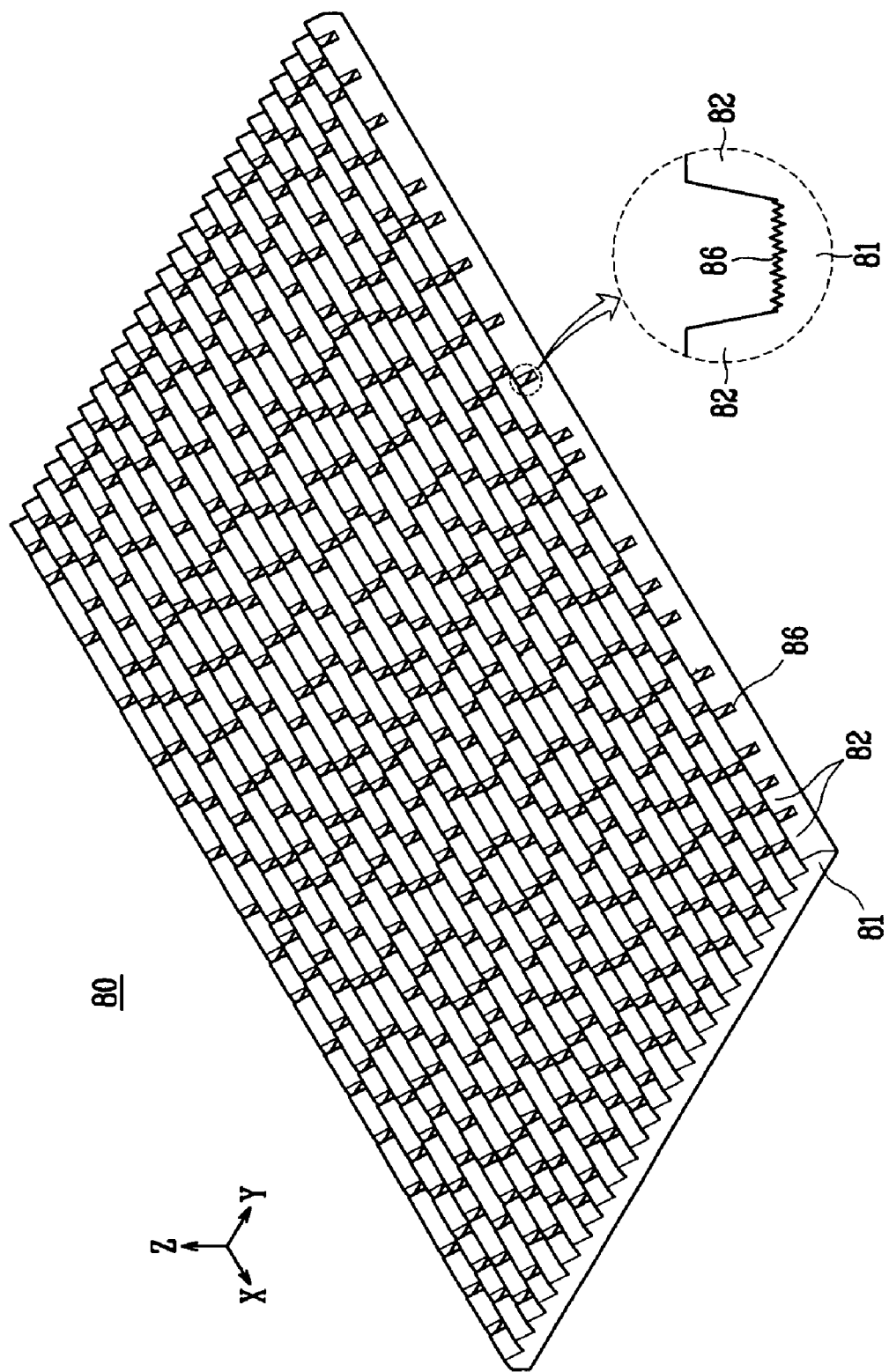
FIG. 1 is a perspective view of a prism member according to an exemplary embodiment of the present invention.
Figure 2:
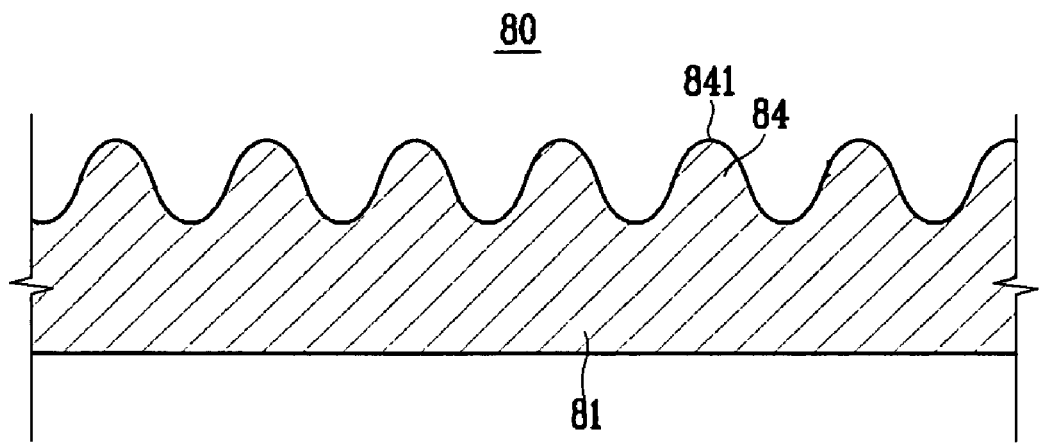
FIG. 2 and FIG. 3 are cross-sectional views of modified shapes of a unit light-concentrating portion of the prism member of FIG. 1.
Figure 3:
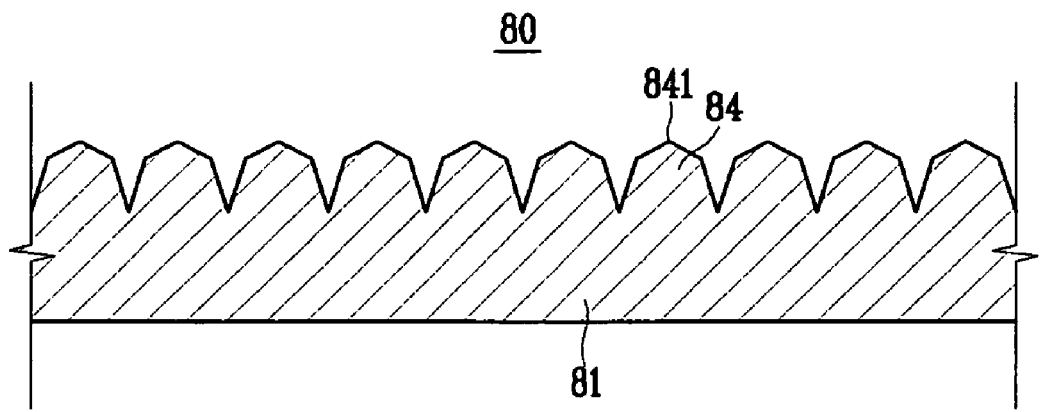
Figure 4:
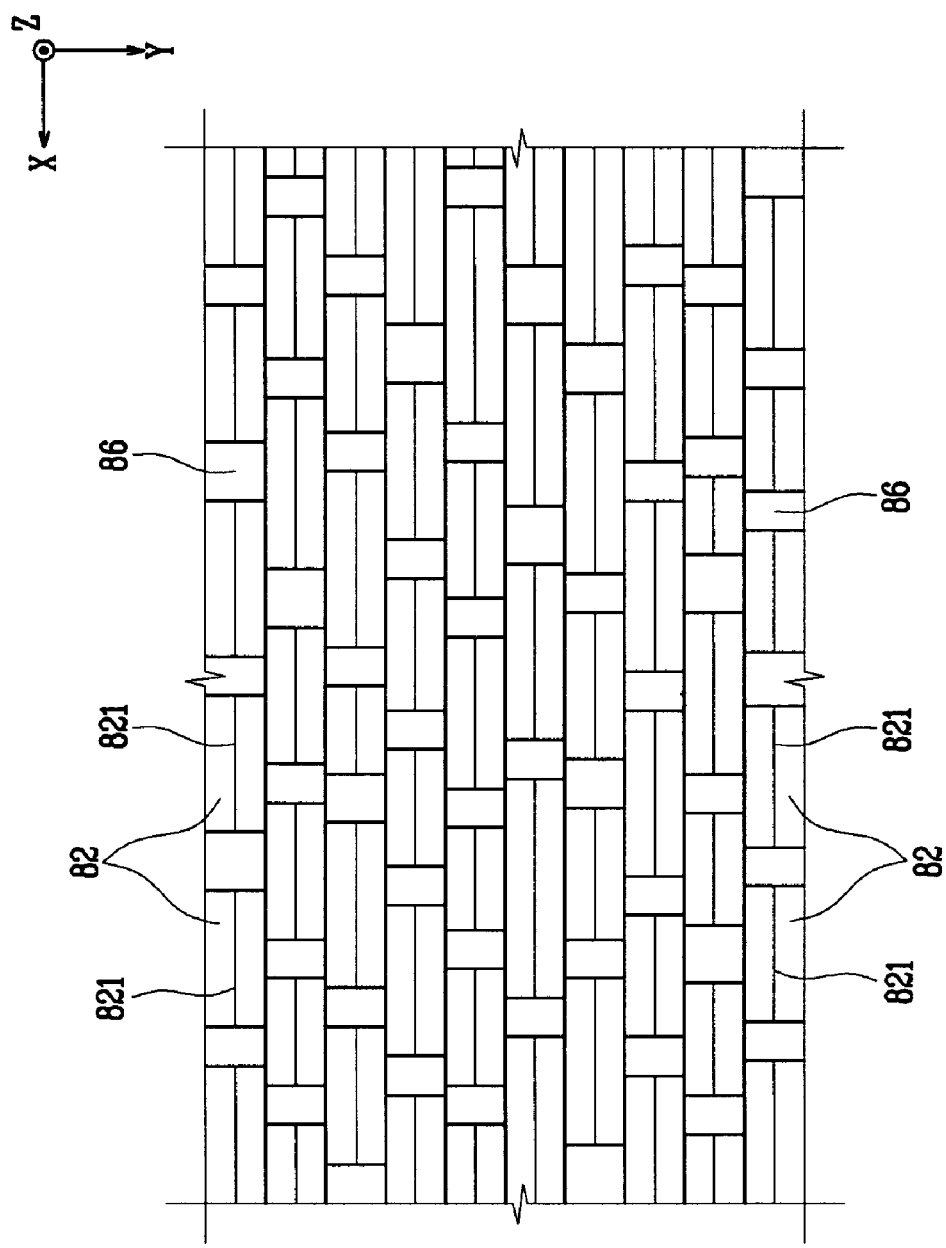
FIG. 4 is a top plan view showing a pattern of the unit light-concentrating portion of the prism member of FIG. 1.

FIG. 1 schematically represents a prism member 80 according to an exemplary embodiment of the present invention, and FIG. 2 and FIG. 3 show modified shapes of the prism member. FIG. 4 shows a pattern of a unit light-concentrating portion 82 of the prism member 80. The size of the unit light-concentrating portion 82 of the prism member 80 shown in FIG. 1 has been exaggerated for convenience of explanation.

As shown in FIG. 1, the prism member 80 includes a plate-shaped body portion 81 and a plurality of unit light-concentrating portions 82 formed on the body portion 81 and arranged along a first direction and a second direction crossing the first direction. The first direction (X-axis direction) is a length direction of the unit light-concentrating portion 82, and the second direction (Y-axis direction) is a width direction of the unit light-concentrating portion 82. In FIG. 1, light passing through the prism member 82 comes out from the surface of the body portion 81 on which the unit light-concentrating portion 82 is formed.

In this exemplary embodiment, the body portion 81 has a thickness of 1 to 5 mm. That is, the prism member 80 according to an exemplary embodiment of the present invention is not a thin sheet or film, but has a plate-shaped body having the above-mentioned thickness. In a case where the thickness of the body portion 81 is less than 1 mm, the prism member 80 may be bent so the that desired light concentration effect cannot be completely obtained. On the other hand, in the case that the thickness of the body portion 81 is greater than 5 mm, light transmittance of the prism member 80 deteriorates, so that loss of light occurs.

A section of the unit light-concentrating portion 82 is formed in a triangular shape. The unit light-concentrating portions 82 arranged along the first direction among the plurality of unit light-concentrating portions 82 included in the prism member 80 are arranged to be spaced from one another with a non-light-concentrating region 86 interposed therebetween. The unit light-concentrating portions 82 are formed to have a length of less than 300 µm, and an area of the non-light-concentrating regions 86 is 300 to 80,000 µm$^2$, because the advantageous the effect when the unit light-concentrating portions 82 are disposed to be spaced with a non-light-concentrating region 86 interposed therebetween is decreased if the length of the unit light-concentrating portions 82 is longer than 300 µm or the area of the non-light-concentrating regions 86 is less than 300 µm$^2$. Furthermore, if the area of the non-light-concentrating regions 86 is greater than 80,000 µm$^2$, the effect of increasing the luminance obtained by the prism member 80 is decreased.

An expanded view of the non-light-concentrating region seen from the Y-axis direction is shown in the dotted circle of FIG. 1. A surface of the non-light-concentrating region 86 is formed to be irregular so as to have surface roughness. The less the degree of surface roughness, the greater the luminance at the front (i.e., at viewing angle 0) is. On the other hand, the greater the degree of surface roughness, the less the luminance at the front is and light is dispersed and more diffused.

Although a section of the unit light-concentrating portion 82 is formed in a triangular shape in FIG. 1, this simply exemplifies the present invention and the present invention is not limited thereto. Thus, as shown FIG. 2 and FIG. 3, the cross section of the unit light-concentrating portion 82 taken along the second direction can be variously changed to have at least one of a rounded or a polygonal shape. As such, if the unit light-concentrating portion 82 is formed to have the cross section of a rounded or polygonal shape, advantages of improving luminance and viewing angle can be obtained.

Referring to FIG. 4, patterns of the unit light-concentrating portion 82 and the non-light-concentrating region 86 of the prism member 80 will be described in detail. Reference numeral 821 of FIG. 2 represents a top portion of the unit light-concentrating portion 82.

As shown in FIG. 4, a plurality of the unit light-concentrating portions 82 are formed to have various lengths, and the non-light-concentrating regions 86 are also formed to have various lengths. Although the non-light-concentrating regions 86 are formed in a plane shape of a quadrangle in FIG. 4, the present invention is not limited thereto, and the non-light-concentrating regions 86 can be formed in various shapes of at least one of a polygon, a circle, and an ellipse. Accordingly, a cross section of each unit light-concentrating portion 82 in the length direction can be formed having various shapes.

That is, in the exemplary embodiment of the present invention, a plurality of the unit light-concentrating portions 82 having random lengths are arranged along the first direction with a non-light-concentrating region 86 that is also randomly formed interposed therebetween.

As such, since the unit light-concentrating portions 82 having an irregular length are arranged with the irregular non-light-concentrating regions 86 interposed therebetween, a bright line typically formed in light passing through the prism member 80 is minimized in a uniform manner. Accordingly, light having passed through the prism member 80 can be concentrated to thereby improve luminance and become more easily diffused. That is, light having a further improved luminance characteristic can be provided.

Figure 5:
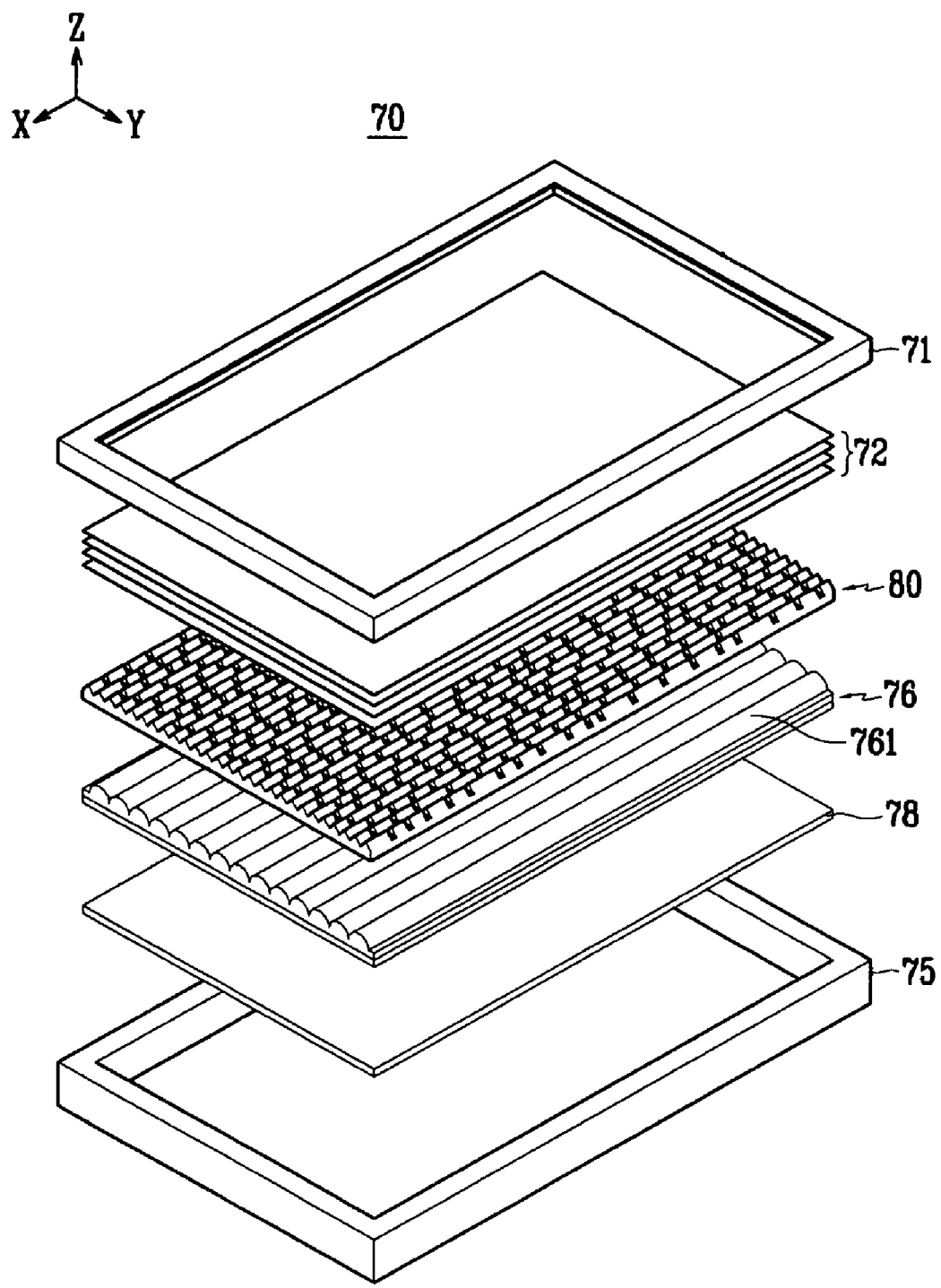
FIG. 5 is an exploded perspective view of a backlight assembly according to an exemplary embodiment of the present invention including the prism member of FIG. 1.

FIG. 5 shows a backlight assembly 70 including the prism member 80 of FIG. 1. Although a planar light source unit is used as a light source unit 76 of the backlight assembly 70 in FIG. 5, this simply exemplifies the present invention, and the present invention is not limited thereto. Thus, instead of the planar light source unit, a tube-type lamp or other light-emitting device can be used as a light source.

As shown in FIG. 5, the backlight assembly 70 according to an exemplary embodiment of the present invention includes a first supporting member 71 and a second supporting member 75, the light source unit 76 disposed between the supporting members 71 and 75, the prism member 80, an optical sheet or sheets 72, and a reflection sheet 79.

Although FIG. 5 shows that both the first supporting member 71 and the second supporting member 75 are used, this simply exemplifies the present invention, and the present invention is not limited thereto. Thus, it may be sufficient that only one of the first and second supporting members 71 and 75 is used.

A planar light source unit having a plurality of channel portions 761 that emit light is used as the light source unit 76. Each channel portion 761 of the planar light source unit forms a discharge space, and gas filled in the discharge space is discharged so as to produce a fluorescent light. The channel portion 761 is formed in the shape of a half cylinder. Light emitted from the planar light source unit is affected by the shape of the channel portions 761 and used in forming a specific image.

The prism member 80 minimizes the generation of the bright line of a constant shape in light forming the specific image emitted from the light source unit 76 by using the irregularly arranged unit light-concentrating portions 82, as shown in FIG. 2.

An appropriate range of distance between the light source unit 76 and the prism member 80 can be widened. If the distance between the light source unit 76 and the prism member 80 becomes outside the appropriate range, a distinct bright line is generated in light having passed through the prism member 80. Since the prism member 80 according to the exemplary embodiment of the present invention maximally suppresses the generation of the bright line, a marginal range of the appropriate distance between the light source unit 76 and the prism member 80 can be widened. Accordingly, it can be assured that a portion of the prism member 80 will not deviate from the appropriate range of distance from the light source unit 76, even when the prism member 80 is changed from its original position by an external impact or is deformed by being bent or twisted by long exposure to high temperature or high humidity.

The optical sheets 72 include a diffuser sheet for further diffusing light having passed through the prism member 80 so that the light is not partially concentrated and for thereby improving uniformity, and a prism sheet for causing light having passed the diffuser sheet to improve luminance. In addition, the optical sheets 72 may further include a protecting sheet for protecting the diffuser sheet and the prism sheet that may be easily scratched and for preventing damage from external impacts and to prevent the inflow of foreign particles.

The reflection sheet 78 is disposed between the second supporting member 75 and the light source unit 76, and plays the roles of reflecting light emitted from the light source unit 76 toward the front direction to thereby decrease light loss and help in the diffusion of light so as to improve uniformity. The reflection sheet 78 may be omitted depending on the type of the light source unit 76. In particular, when a planar light source unit having a reflection layer included therein is used as the light source unit 76, the reflection sheet 78 may be omitted.

Figure 6:
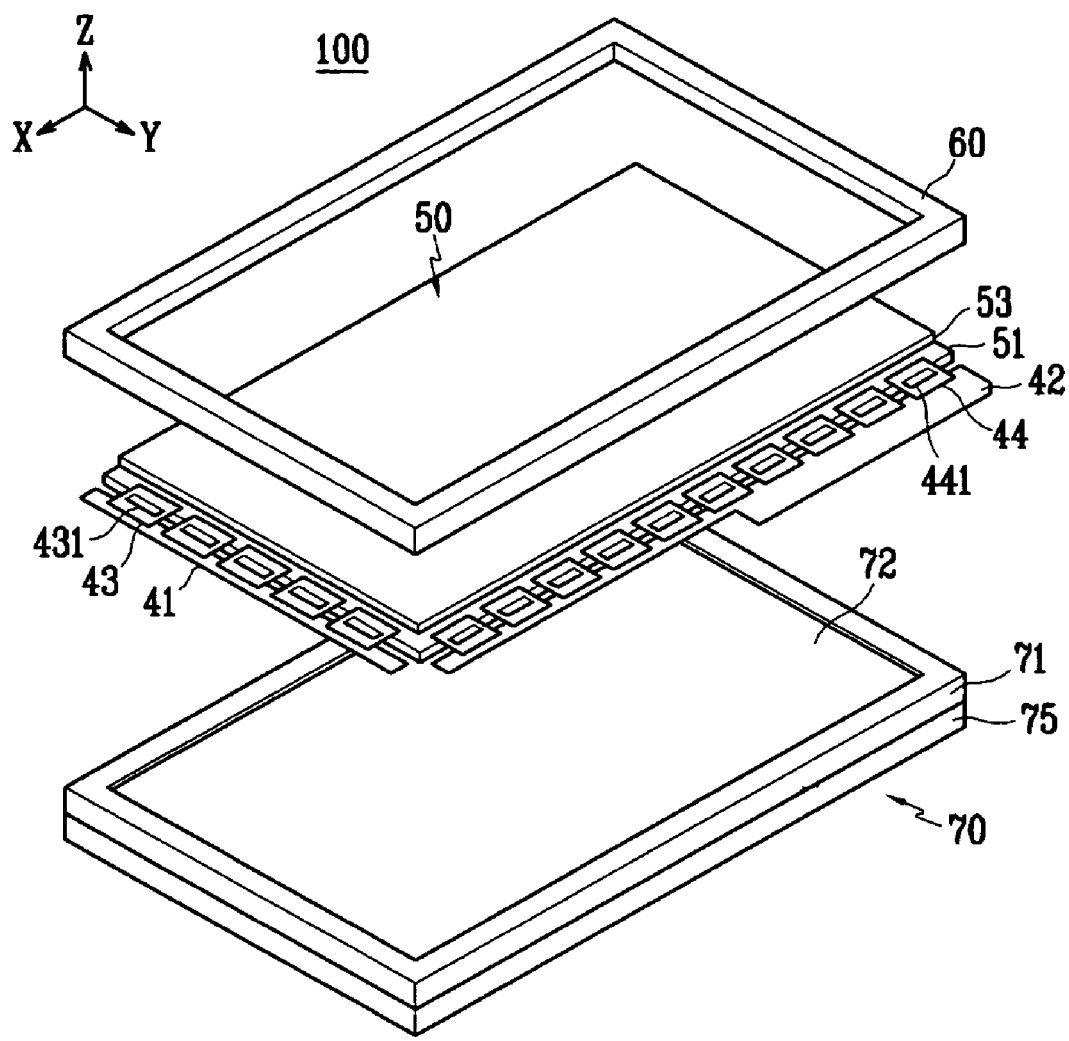
FIG. 6 is an exploded perspective view of a display according to the exemplary embodiment of the present invention including the backlight assembly of FIG. 5.

FIG. 6 shows a display device 100 including the backlight assembly 70 of FIG. 5.

Although FIG. 6 shows a liquid crystal panel as an exemplary embodiment of a panel assembly 50 used in the display device 100, this is only an example of an embodiment of the present, and the present invention is not limited thereto. Different kinds of non-emissive types of display panels can be used.

As shown in FIG. 6, the display device 100 according to an exemplary embodiment of the present invention includes the backlight assembly 70 for supplying light and the panel assembly 50 for receiving light and displaying images. Further, the display device 100 includes a supporting member 60 for fixing the panel assembly 50 on the backlight assembly 70.

Further, the display device 100 includes driving printed circuit boards (PCBs) 41 and 42 for supplying driving signals to the panel assembly 50, and driving IC packages 43 and 44 for electrically connecting the driving PCBs 41 and 42 and the panel assembly 50. The driving IC packages 43 and 44 may be formed as a COF (chip on film) or a TCP (tape carrier package). The driving PCBs include a gate driving PCB 41 and a data driving PCB 42, and the driving IC packages include a gate driving IC package 43 connecting the panel assembly 50 and the gate driving PCB 41 and a data driving IC package 44 connecting the panel assembly 50 and the data driving PCB 42.

The panel assembly 50 includes a first display panel 51 and a second display panel 53 arranged to face the first display panel 51 with a liquid crystal layer 52 (shown in FIG. 8) interposed between the panels 51 and 53. Here, the first display panel 51 is a rear substrate, and the second display panel 53 is a front substrate. The driving IC packages 43 and 44 are connected to the first display panel 51. The gate driving IC package 43 is attached to one edge of the first display panel 51, and the gate driving IC package 43 includes an IC chip 431 constituting a gate driver 400 (shown in FIG. 7). The data driving IC package 44 is attached to the other edge of the first display panel 51, and the data driving IC package 44 includes an IC chip 441 constituting a data driver 500 and a gray voltage generator 800 (shown in FIG. 7).

Figure 7:
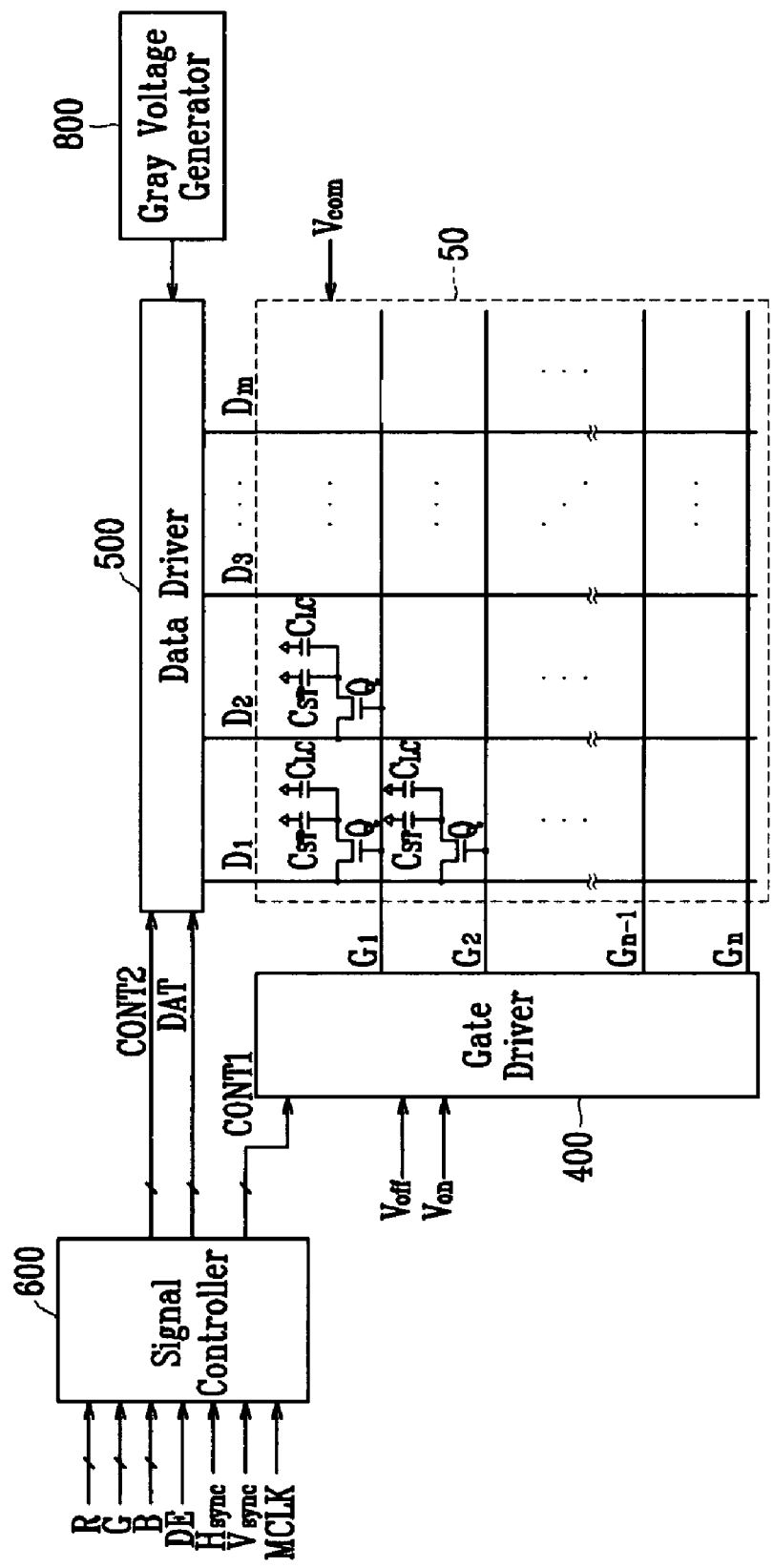
FIG. 7 is a block diagram of a panel assembly of the display device of FIG. 4 and a driving apparatus thereof.

Referring to FIG. 7 and to FIG. 8, the panel assembly 50 and an apparatus for driving the same will be explained in detail.

Figure 8:
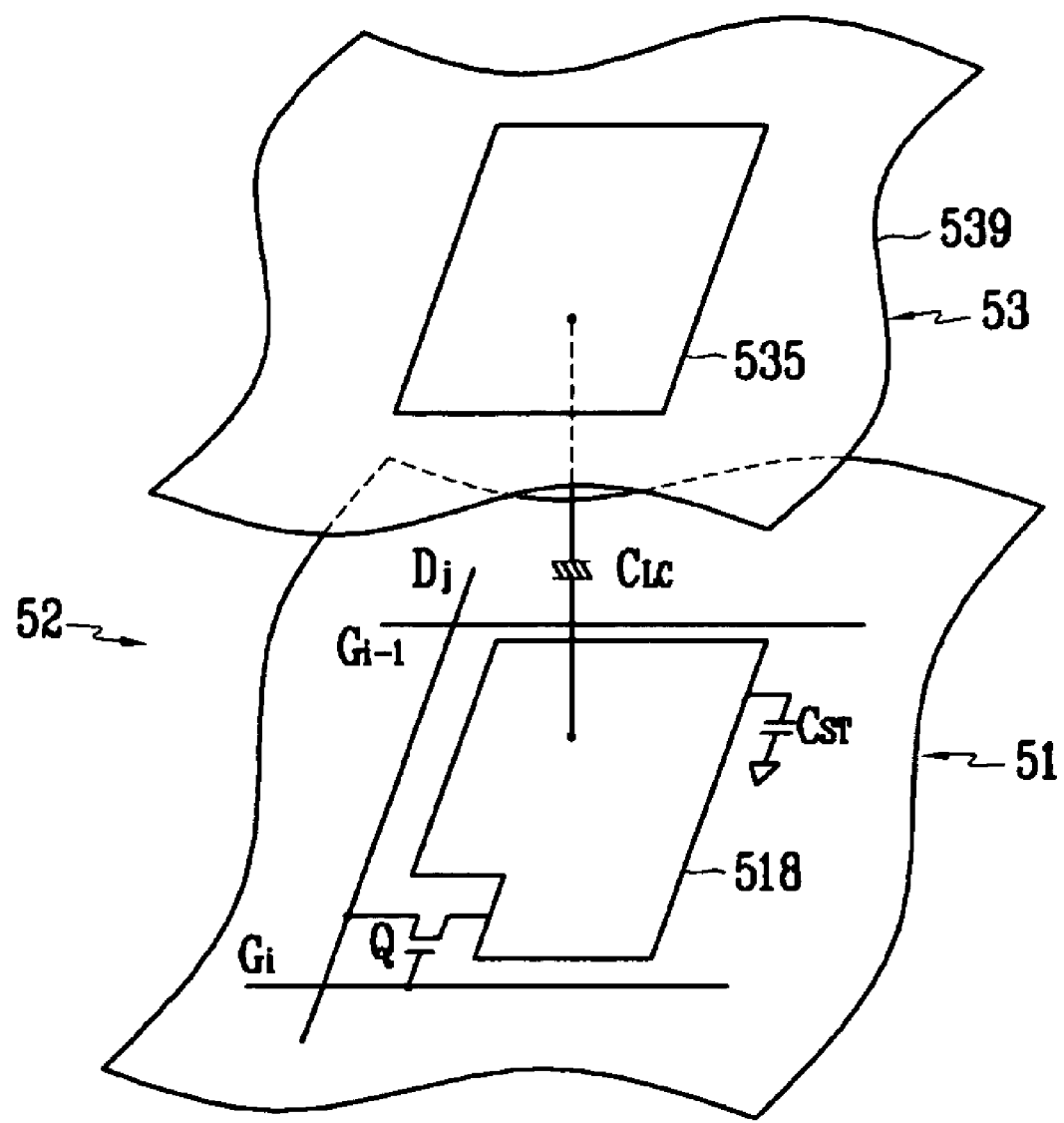
FIG. 8 is an equivalent circuit diagram of one pixel of the panel assembly of FIG. 5.

As shown in FIG. 7 and FIG. 8, the first display panel 51 includes a plurality of signal lines $G_1$ to $G_n$ and $D_1$ to $D_m$. The first and second display panels 51 and 53 are connected to the signal lines $G_1$ to $G_n$ and $D_1$ to $D_m$, and include a plurality of pixels substantially arranged in a matrix shape.

The signal lines $G_1$ to $G_n$ and $D_1$ to $D_m$ include a plurality of gate lines $G_1$ to $G_n$ for transmitting gate signals (also referred to as scanning signals) and data lines $D_1$ to $D_m$ for transmitting data signals. The gate lines $G_1$ to $G_n$ substantially extend in a row direction and are parallel to one another, and the data lines $D_1$ to $D_m$ substantially extend in a column direction and are parallel to one another.

Each pixel includes a switching element Q connected to the signal lines $G_1$ to $G_n$ and $D_1$ to $D_m$, a liquid crystal capacitor $C_{LC}$, and a storage capacitor $C_{ST}$, each connected to the switching element Q. If desired, the storage capacitor $C_{ST}$ can be omitted.

A thin film transistor may be an example of the switching element Q, and this is formed on the first display panel 51. The thin film transistor is a three terminal element, and a control terminal and an input terminal thereof are connected to the gate lines $G_1$ to $G_n$ and the data lines $D_1$ to $D_m$, respectively, and an output terminal thereof is connected to the liquid crystal capacitor $C_{LC}$ and the storage capacitor $C_{ST}$.

The signal controller 600 controls operations of the gate driver 400 and the data driver 500. The gate driver 400 applies gate signals constituted by a combination of a gate-on voltage Von and a gate-off voltage Voff to the gate lines $G_1$ to $G_n$, and the data driver 500 applies data voltages to the data lines $D_1$ to $D_m$. The gray voltage generator 800 generates two sets of gray voltages related to light transmittance of the pixels, and supplies the generated gray voltages to the data driver 500 as data voltages. One of the two sets of gray voltages has a positive value with respect to the common voltage Vcom, and the other of the two sets of gray voltages has a negative value with respect to the common voltage Vcom.

As shown in FIG. 8, the liquid crystal capacitor $C_{LC}$ has two terminals of a pixel electrode 518 of the first display panel 51 and a common electrode 539 of the second display panel 53, and the liquid crystal layer 52 between the two electrodes 518 and 539 serves as a dielectric material. The pixel electrode 518 is connected to the switching element Q. The common electrode 539 is formed on the entire surface of the second display panel 53, and a common voltage Vcom is applied to the common electrode 539. Unlike what is shown in FIG. 8, the common electrode 539 may be provided on the first display panel 51. In that case, at least one of the two electrodes 518 and 539 can be formed in a linear or bar shape. A color filter 535, which endows color to transmitted light, is formed on the second display panel 53. Unlike what is shown in FIG. 8, the color filter 535 may be formed on the first display panel 51.

The storage capacitor $C_{ST}$, which assists the function of the liquid crystal capacitor $C_{LC}$, has a separate signal line (not shown) provided on the first display panel 51 and the pixel electrode 518 to overlap each other with an insulator therebetween. A fixed voltage, such as the common voltage Vcom, is applied to the separate signal line. However, the storage capacitor $C_{ST}$ may be formed by the pixel electrode 518 and the overlying previous gate lines $G_1$ to $G_n$ arranged to overlap each other with an insulator therebetween.

A polarizer (not shown), which polarizes light, is attached to an outer surface of at least one of the two substrates 51 and 53 of the panel assembly 50.

Under such structures, if the thin film transistor, which is a switching element, is turned on, an electric field is generated between the pixel electrode 518 and the common electrode 539. The alignment angle of the liquid crystals of the liquid crystal layer 52 between the first display panel 51 and the second display panel 53 varies depending on the electric field, and a change in the alignment angle of the liquid crystal causes a change in transmittance of light so that desired images are realized.

Figure 9:
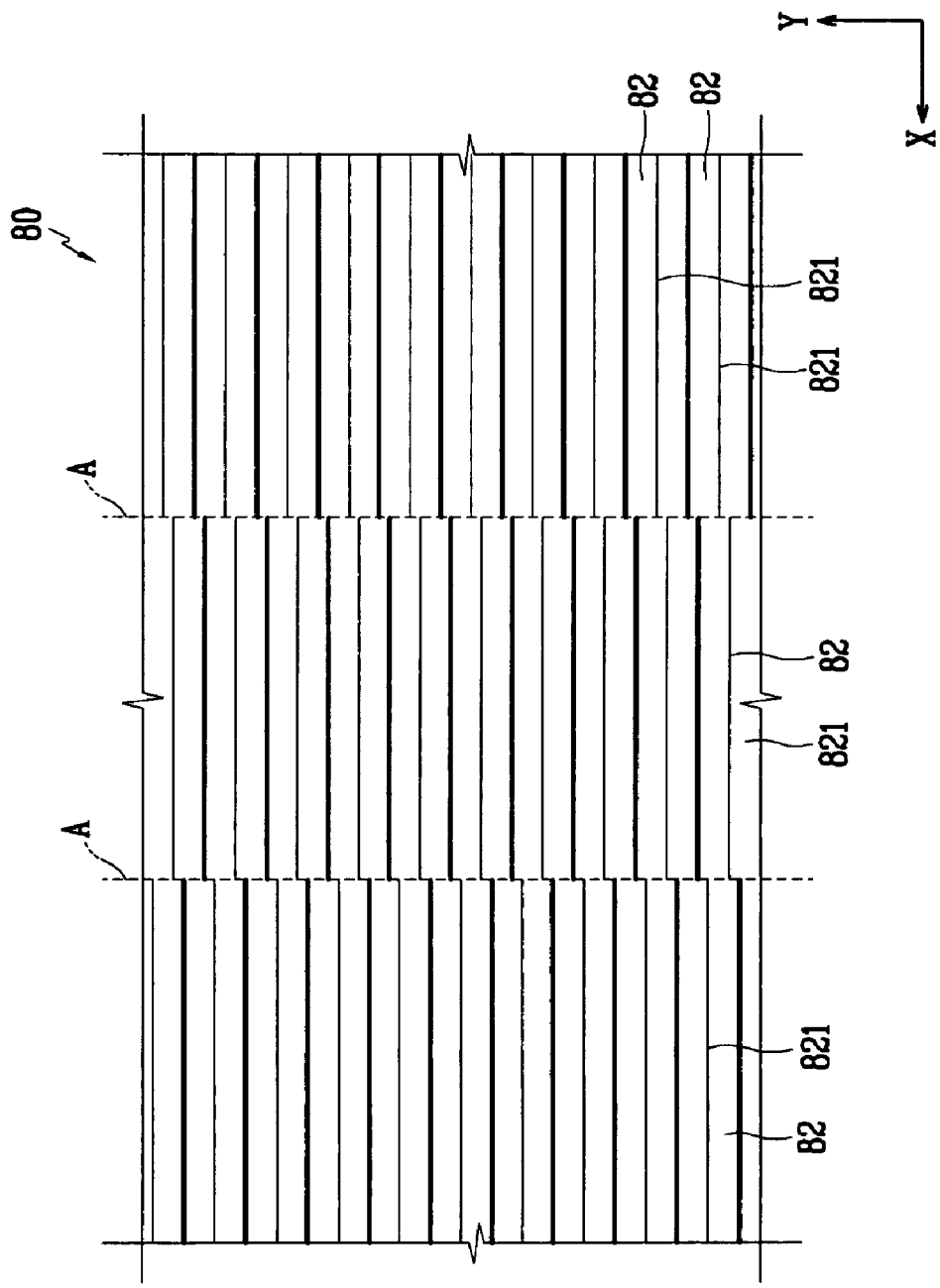
FIG. 9 is a top plan view of a pattern of a unit light-concentrating portion of a prism member of a display device according to an exemplary embodiment of the present invention.

Referring to FIG. 9, an exemplary embodiment of the present invention will be explained. FIG. 9 shows a pattern of the unit light-concentrating portion 82 of the prism member 80 included in a display device according to an exemplary embodiment of the present invention.

As shown in FIG. 9, the prism member 80 includes a plurality of unit light-concentrating portions 82 arranged along a first direction and a second direction crossing the first direction. The unit light-concentrating portions 82 arranged along the first direction among a plurality of the unit light-concentrating portions 82 are staggered or shifted so as to miss each other at an arbitrary line A extending along the second or column direction. Accordingly, upper portions 821 of the unit light-concentrating portions 82 miss each other as well, and the unit light-concentrating portions 821 formed on the prism member 80 are irregularly arranged. Although lengths of the unit light-concentrating portions are shown to be equal in FIG. 9, this simply exemplifies the present invention, and the present invention is not limited thereto. Thus, lengths of the unit light-concentrating portions can be of various lengths.

As such, by the irregularly arranged unit light-concentrating portion, the possibility that a bright line is generated in the light having passed the prism member 80 in a uniform manner can be minimized. Accordingly, it is possible to make light having passed through the prism be more diffuse, as well as to improve luminance by concentrating the light passed through the prism member 80. That is, light having a further improved luminance characteristic can be provided.

Figure 10:
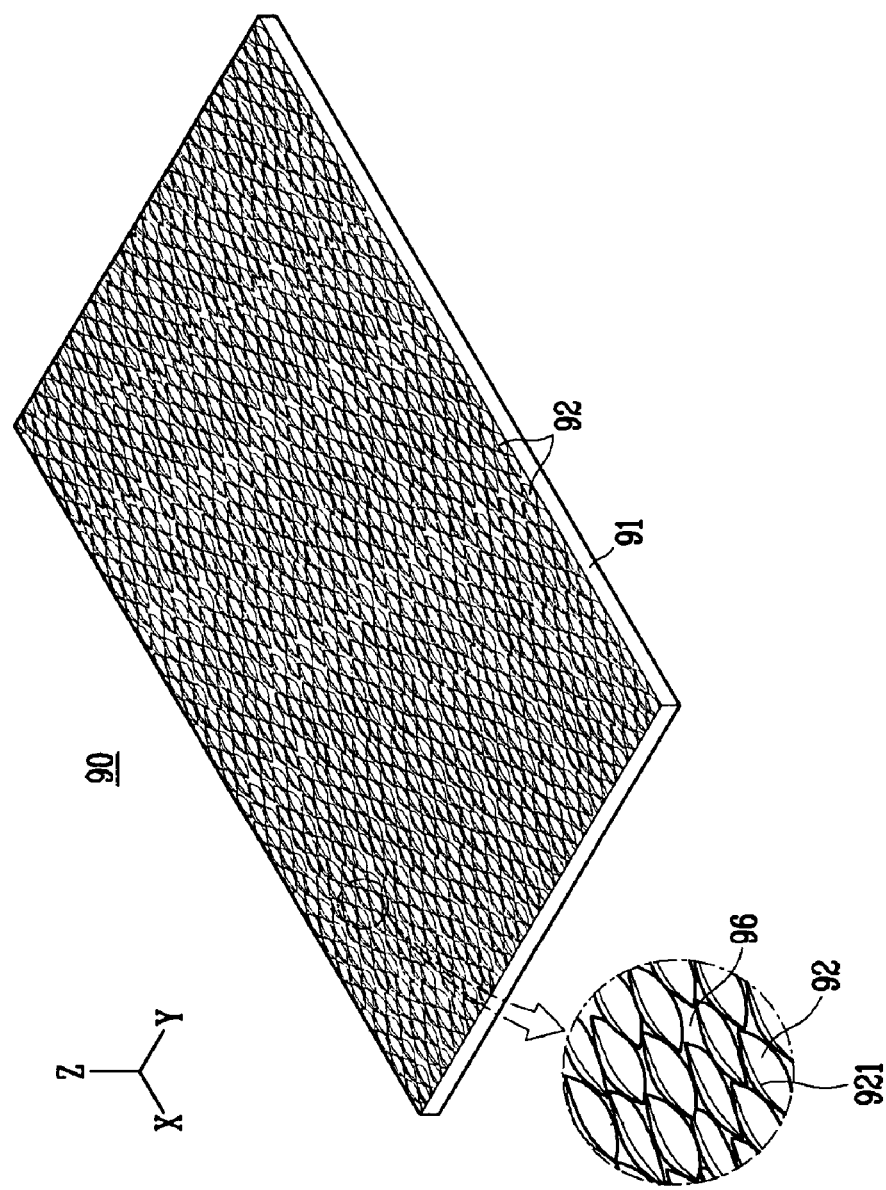
FIG. 10 is a perspective view of a prism member of a display device according to an exemplary embodiment of the present invention.

Referring to FIG. 10, an exemplary embodiment of the present invention will be explained. FIG. 10 shows a prism member 90 included in a display device according to an exemplary embodiment of the present invention. The size of a unit light-concentrating portion 92 of the prism member 90 shown in FIG. 10 has been exaggerated for convenience of explanation. Reference numeral 921 of FIG. 10 represents a top portion of the unit light-concentrating portion 92.

As shown in FIG. 10, the prism member 90 includes a plate-type body portion 91 and a plurality of unit light-concentrating portions 92 formed on the body portion 91 and arranged along a first direction and a second direction crossing the first direction. Here, a height and a width of each unit light-concentrating portion 92 gradually decrease approaching both ends in the first direction. In addition, the plurality of unit light-concentrating portions 92 are arranged along the first direction to partially overlap each other with respect to the second direction. Furthermore, a non-light-concentrating region 96, which is a region between adjacent ones of the unit light-concentrating portions 92, may be formed to have an irregular cross section so as to form a surface roughness. Unlike what is shown in FIG. 10, the prism member 90 may be formed without the specifically formed non-light-concentrating region 96.

By the unit light-concentrating portions 92 arranged in this way, a bright line generated in light having passed the prism member 90 can be suppressed. Accordingly, it is possible to make conditions to diffuse light having passed as well as to improve luminance by concentrating light having passed the prism member 90. That is, light having further improved luminance characteristics can be provided.

Figure 11:
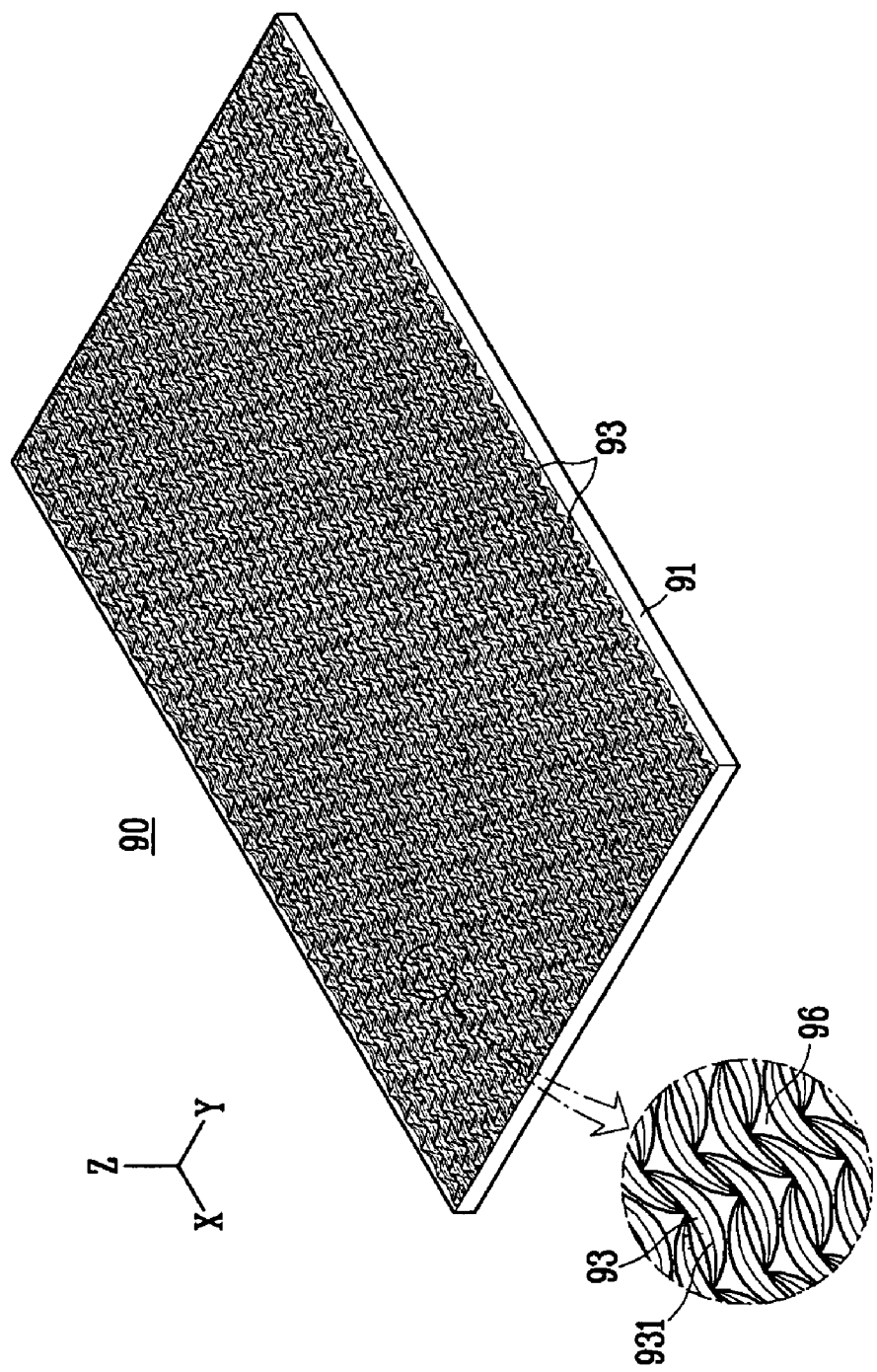
FIG. 11 is a perspective view of a prism member of a display device according to an exemplary embodiment of the present invention.

Referring to FIG. 11, an exemplary embodiment of the present invention will be explained. FIG. 11 shows the prism member 90 included in a display device according to an exemplary embodiment of the present invention. The size of a unit light-concentrating portion 93 of the prism member 90 shown in FIG. 11 has been exaggerated for convenience of explanation. Reference numeral 931 of FIG. 11 represents an upper portion of the unit light-concentrating portion 93.

As shown in FIG. 11, the prism member 90 includes the plate-type body portion 91 and a plurality of unit light-concentrating portions 93 formed on the body portion 91 and arranged along a first direction and a second direction crossing the first direction. Here, height and width of each unit light-concentrating portion 93 gradually decrease approaching both ends in the first direction, and the unit light-concentrating portion 93 is bent approaching both ends in the first direction, such that the ends of neighboring unit light-concentrating portions 93 face each other along the first direction. In addition, the unit light-concentrating portions 93 are arranged along the first direction to partially overlap each other with respect to the second direction. Furthermore, a non-light-concentrating region 96, which is a region between adjacent ones of the unit light-concentrating portions 93, may be formed to have an irregular cross section so as to have surface roughness. Unlike what is shown in FIG. 11, the prism member 90 may be formed without the specially formed non-light-concentrating region 96.

Overall irregularity is enhanced by the unit light-concentrating portion 93 arranged as described above, so that a bright line generated in light having passed the prism member 90 in a uniform manner can be suppressed. Accordingly, it is possible diffuse the light having passed through the prism, as well as to improve luminance by concentrating light having passed through the prism member 90. That is, light having further improved luminance characteristics can be provided.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

As described above, according to exemplary embodiments of the present invention, a prism member having further improved luminance characteristics of transmitted light can be provided.

The prism member can minimize formation of a bright line in light passing through the prism member in a uniform manner by the irregularly arranged unit light-concentrating portion with various shapes. Accordingly, light having passed the prism member can be concentrated to thereby improve luminance, and it becomes easily diffused. That is, light having further improved luminance characteristics can be provided.

In addition, if the unit light-concentrating portion is formed to have a cross section with a rounded or a polygonal shape, the luminance and the viewing angle can be improved.

A backlight assembly including the prism member as described above can be provided.

The prism member minimizes the generation of the bright line of a constant shape in light having the specific image emitted from the light source unit, using the irregularly arranged unit light-concentrating portions.

An appropriate range of distance between the light source unit and the prism member can be widened in the backlight assembly. That is, a marginal range of the appropriate distance between the light source unit and the prism member can be widened.

Thus, a display device including the backlight assembly as described above can be provided.

Accordingly, by providing maximally uniform light arriving at the panel assembly, an external quality of the display device can be improved.

What is claimed is:
1. A backlight assembly comprising:
a light source unit for emitting light;
a prism member through which light emitted from the light source unit passes; and
a supporting member for supporting the light source unit and the prism member in overlaying relationship,
wherein the prism member includes
a plate-type body portion having a predetermined thickness, and
a plurality of unit light-concentrating portions formed on at least one surface of the body portion and arranged along a first direction and in a second direction crossing the first direction,
wherein the first direction is a length direction of the plurality of unit light-concentrating portions and the second direction is a width direction of the plurality of unit light-concentrating portions,
wherein adjacent ones of the plurality of unit light-concentrating portions arranged along the first direction are spaced apart with one of a plurality of non-light-concentrating regions formed therebetween, and wherein the plurality of unit light-concentrating portions on a straight line along the first direction have irregular lengths.

2. The backlight assembly of claim 1, wherein the predetermined thickness of the body portion is between 1 and 5 mm.

3. The backlight assembly of claim 1, wherein the non-light-concentrating regions are formed to have various sizes.

4. The backlight assembly of claim 1, wherein the non-light-concentrating regions are formed to have irregular cross sections.

5. The backlight assembly of claim 1, wherein a cross section along the second direction has one of a rounded and a polygonal shape.

6. The backlight assembly of claim 1, wherein the light source unit comprises a planar light source unit having a plurality of channel portions for emitting light.

7. A display device comprising:
- a panel assembly for displaying an image;
- a light source unit for supplying light to the panel assembly;
- a prism member disposed between the panel assembly and the light source unit; and
- a supporting member for supporting the panel assembly, the light source unit, and the prism member in an overlaying relationship, wherein the prism member includes a plate-type body portion having a predetermined thickness, and a plurality of unit light-concentrating portions formed on at least one surface of the body portion and arranged along a first direction and in a second direction crossing the first direction, wherein the first direction is a length direction of the plurality of unit light-concentrating portions and the second direction is a width direction of the plurality unit light-concentrating portions, wherein adjacent ones of the plurality of unit light-concentrating portions arranged along the first direction are spaced apart with one of a plurality of non-light-concentrating regions therebetween, and wherein the plurality of light-concentrating portions on a straight line along the first direction have irregular lengths.

8. The display device of claim 7, wherein the predetermined thickness of the body portion is between 1 and 5 mm.

9. The display device of claim 7, wherein the non-light-concentrating regions are formed to have various sizes.

10. The display device of claim 7, wherein the non-light-concentrating regions are formed to have irregular cross sections.

11. The display device of claim 7, wherein a cross section along the second direction has one of a rounded and a polygonal shape.

12. The display device of claim 7, wherein the light source unit comprises a planar light source unit having a plurality of channel portions for emitting light.

* * * * *